United States Patent
Cordell (10) Patent No.: US 10,303,776 B2
(45) Date of Patent: May 28, 2019

(54) MULTI-CHANNEL CROSS-MODALITY SYSTEM FOR PROVIDING LANGUAGE INTERPRETATION/TRANSLATION SERVICES

(71) Applicant: Language Line Services, Inc., Monterey, CA (US)

(72) Inventor: Jeffrey Cordell, Carmel, CA (US)

(73) Assignee: Language Line Services, Inc., Monterey, CA (US)

( * ) Notice: Subject to any disclaimer, the term of this patent is extended or adjusted under 35 U.S.C. 154(b) by 0 days.

(21) Appl. No.: 14/738,602

(22) Filed: Jun. 12, 2015

(65) Prior Publication Data

US 2016/0364383 A1    Dec. 15, 2016

(51) Int. Cl.
G06F 17/28    (2006.01)

(52) U.S. Cl.
CPC ................. *G06F 17/289* (2013.01)

(58) Field of Classification Search
CPC ...................................... G06F 17/289
USPC ............................................. 704/2
See application file for complete search history.

(56) References Cited

U.S. PATENT DOCUMENTS

2004/0184461 A1* 9/2004 Forssell .............. H04L 12/2854
                                                            370/395.2
2005/0071746 A1* 3/2005 Hart ...................... G06F 3/1206
                                                            715/200
2005/0086044 A1* 4/2005 Hess ...................... G06F 17/289
                                                            704/2

(Continued)

OTHER PUBLICATIONS

Yelp (www.yelp.com/biz/language-innovations-washington?osq=interpreter retreived May 26, 2016, with review dated Feb. 21, 2014).*

(Continued)

*Primary Examiner* — Edwin S Leland, III
(74) *Attorney, Agent, or Firm* — Patent Ingenuity, P.C.; Samuel K. Simpson (57) ABSTRACT

A computer implemented language interpretation/translation platform is provided so that a computerized interface can be generated to display a variety of language interpretation/translation services. The computer implemented language interpretation/translation platform includes a receiver that receives a request for computerized interface data from a computing device and receives a plurality of interface data from a plurality of distinct language interpretation/translation platforms. Each of the plurality of distinct language interpretation/translation platforms provide a language/interpretation service according to a distinct modality. The computer implemented language interpretation/translation platform includes a processor that aggregates the plurality of interface data from the plurality of distinct language interpretation/translation platforms in real-time into a computerized interface format. The computer implemented language interpretation/translation platform includes a transmitter that sends the computerized interface format to the computing device for display by the computing device so that the computing device receives a selection of an optimal language interpretation/translation service.

15 Claims, 7 Drawing Sheets

(56) References Cited

U.S. PATENT DOCUMENTS

| | | | | |
|---|---|---|---|---|
| 2006/0259307 | A1* | 11/2006 | Sanders | G06F 17/289 |
| | | | | 705/26.1 |
| 2008/0195482 | A1* | 8/2008 | Sailer | G06F 17/289 |
| | | | | 705/14.14 |
| 2009/0055208 | A1* | 2/2009 | Kaiser | G06Q 10/02 |
| | | | | 705/5 |
| 2009/0204389 | A1* | 8/2009 | Wang | G06F 17/289 |
| | | | | 704/7 |
| 2013/0085881 | A1* | 4/2013 | Chary | G06Q 30/02 |
| | | | | 705/26.1 |
| 2014/0278342 | A1* | 9/2014 | Shoshan | G06F 17/289 |
| | | | | 704/2 |
| 2014/0317301 | A1* | 10/2014 | Kiet | H04L 67/141 |
| | | | | 709/227 |
| 2016/0019205 | A1* | 1/2016 | Kidwai | G06F 17/2836 |
| | | | | 704/7 |
| 2016/0364383 | A1* | 12/2016 | Cordell | G06F 17/289 |
| 2017/0212885 | A1* | 7/2017 | Cordell | G06F 16/44 |

OTHER PUBLICATIONS

Language Innovations (www.languageinnovations.com, retieved from the internet archive on Sep. 29, 2016 with an as of date of Feb. 28, 2014).*

Transperfect.com (www.transperfect.com/services/interpretation.html retrieved from the internet archive on Aug. 11, 2017 with an as of date of Apr. 6, 2015).*

* cited by examiner

MULTI-CHANNEL CROSS-MODALITY SYSTEM FOR PROVIDING LANGUAGE INTERPRETATION/TRANSLATION SERVICES

BACKGROUND

1. Field

This disclosure generally relates to the field of language interpretation/translation. More particularly, the disclosure relates to computer implemented language interpretation/translation platforms that provide language interpretation/translation services.

2. General Background

A variety of computer implemented language interpretation/translation platforms, which shall be referred to as language interpretation/translation platforms, may be utilized to provide language interpretation/translations services to users. For example, a first language interpretation/translation platform may allow a user to obtain language interpretation/translation services from a language interpreter/translator via a voice communication whereas a second distinct language interpretation/translation platform may allow the user to obtain language interpretation/translation services via a video conference.

A user may have varying language interpretation/translation needs that necessitate use of different language interpretation/translation platforms. For example, a user may prefer a language/interpretation service provided through a video conference in a medical environment whereas that same user may prefer a language interpretation/translation service via a voice communication in a business environment. The user may have additional needs that may change the user's preferences, e.g., timing of service availability, service cost, and service geography. For instance, the user may be more inclined to consider using the language interpretation/translation service via the voice communication in the medical environment where the timing of providing medical attention may be important if the user was aware that the wait time for a language interpreter/translator via a video conference was significantly greater than the wait time for a language interpreter/translator via a voice communication. Further, the user may be more inclined to consider using the language interpretation/translation service via the voice communication in the medical environment if the user was aware that the cost of the language interpretation/translation service via the video conference was more expensive than the language interpretation/translation service via the voice communication at the time of the request, i.e., the cost for language interpretation/translation services may fluctuate based upon time of day or night, interpreter/translator availability, etc.

Yet, current language interpretation/translation systems do not function efficiently enough to provide such information to users. As a result, users may often select a language interpretation/translation service that is not the optimal solution that would be selected by the user had the user been provided with information that would have helped the user in the selection process.

SUMMARY

A computer implemented language interpretation/translation platform is provided so that a computerized interface can be generated to display a variety of language interpretation/translation services. The computer implemented language interpretation/translation platform includes a receiver that receives a request for computerized interface data from a computing device and receives a plurality of interface data from a plurality of distinct language interpretation/translation platforms. Each of the plurality of distinct language interpretation/translation platforms provides a language/interpretation service according to a distinct modality. Further, the computer implemented language interpretation/translation platform includes a processor that aggregates the plurality of interface data from the plurality of distinct language interpretation/translation platforms in real-time into a computerized interface format. In addition, the computer implemented language interpretation/translation platform includes a transmitter that sends the computerized interface format to the computing device for display by the computing device so that the computing device receives a selection of an optimal language interpretation/translation service.

A computer program product is also provided. The computer program product comprises a computer readable storage device having a computer readable program stored thereon. When executed on a computer, the computer readable program causes the computer to receive a request for computerized interface data from a computing device. Further, the computer is caused to receive a plurality of interface data from a plurality of distinct language interpretation/translation platforms. Each of the plurality of distinct language interpretation/translation platforms provides a language/interpretation service according to a distinct modality. In addition, the computer is caused to aggregate the plurality of interface data from the plurality of distinct language interpretation/translation platforms in real-time into a computerized interface format. The computer is also caused to send the computerized interface format to the computing device for display by the computing device so that the computing device receives a selection of an optimal language interpretation/translation service.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A multi-channel cross-modality system provides a computerized interface to a user through a client device. The computerized interface allows the user to obtain a real-time or near real-time set of data that helps the user determine which interpretation/translation service is the most optimal based upon the customer's current interpretation/translation needs. Further, the computerized interface displays data that can have significant fluctuations based upon the time of day or night, e.g., waiting time, price, etc.

The multi-channel cross-modality system improves the functionality of a computer by providing more information than previous systems to a user so that the computer can select the most optimal interpretation/translation for the user based upon a user input, an automatically generated recommendation, or an automatic determination. In other words, the accuracy of selection of a language interpretation/translation service is improved as the multi-channel cross-modality system utilizes an automated approach to obtain real-time or near real-time data associated with each of a variety of different language interpretation/translation services. The computerized interface provides more information to the user than provided with previous systems so that the user is able to select the most optimal language interpretation/translation solution for a current set of circumstances. Further, the multi-channel cross-modality system provides a computerized interface that can be automatically updated in real-time so that the user is aware of fluctuations in proximity, waiting time, price, etc. of the various language interpretation/translation services.

Figure 1:
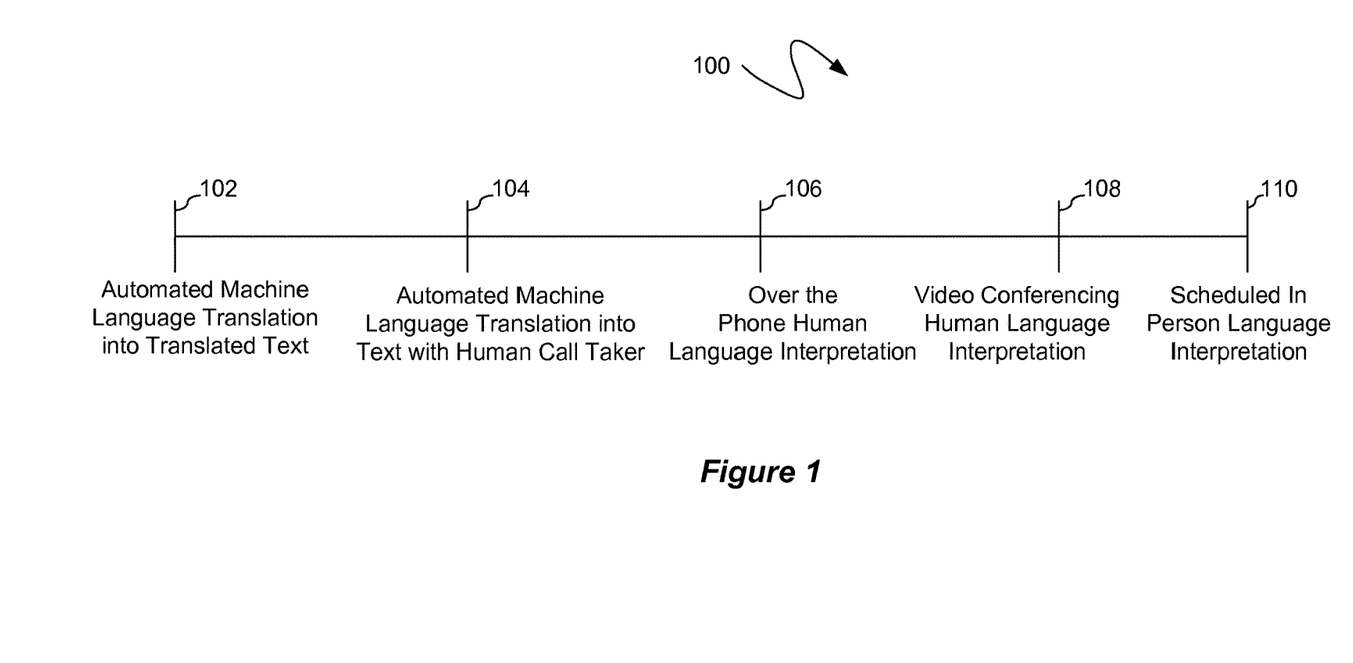
FIG. 1 illustrates an example of a language interpretation/translation platform spectrum.

FIG. 1 illustrates an example of a language interpretation/translation platform spectrum 100. The language interpretation/translation platform spectrum 100 provides a variety of different language interpretation/translation services that are ordered according to level of difficulty in providing such a service.

For instance, at a point 102, the spectrum 100 includes an automated machine language translation service. The automated machine language translation service is capable of performing language translation via a machine language translator from voice and/or text into written text. For example, a language translation system can allow a user to download an application to a smartphone. The application then allows the user to speak or type particular words in a first spoken language to obtain a machine language generated translation of those words into a second spoken language. The application can display the machine language generated translation via a display screen that is integrated with or in operable communication with the smartphone.

Although implementation of the automated machine language translation service may be considered to be the least difficult amongst the various language interpretation/translation services of the spectrum 100, the quality provided by such a translation may also be the least accurate. For example, the automated machine language translation service may not process spoken words from a speaker in a first spoken language accurately. Such inaccuracy may result from factors such as talking speed and enunciation of the speaker. The automated machine language translation service may simply not be able to process the spoken words of the speaker quickly enough to process an accurate language translation.

Further, the automated machine language translation service may not be aware of the context in which the request for language translation is received and may not be capable of utilizing such information even if the automated machine language translation service had such information. For example, a request for language translation may be performed in a medical situation where certain vocabulary has a different meaning in the translated language for that medical context. The automated machine language translation service may not provide an accurate translation for that context. Since the automated machine language translation service may be the service necessitating the least difficult implementation in the spectrum 100 and the service that provides the least accurate translation, the automated machine language translation service may be provided for a lesser price than the other services in the spectrum 100. A user that does not necessitate a high accuracy language translation in a particular context and has cost considerations may find such a service to be an optimal solution.

At a point 104, the spectrum 100 also includes an automated machine language translation and human call taker service. Such a service allows a human call taker to interact with a speaker that speaks a different language, e.g., a limited English proficiency speaker ("LEP"), with the assistance of a machine language interpreter/translator. For instance, the automated machine language and human call taker service may be implemented at emergency response centers so that an LEP that is in need of help from the emergency response center can communicate with an English speaking emergency response operator.

For instance, the LEP can send a text message in Spanish to the emergency response center. The English speaking emergency response operator can then request that the automated machine language translator translate the text message into English so that the English speaking emergency response operator can understand the request. The English speaking emergency response operator can then utilize the machine language interpreter/translator to translate requests for more information or other data into Spanish so that the English speaking emergency response operator can effectively communicate with the LEP. As the emergency response operator may have contextual information regarding the LEP, emergency situation, etc., the emergency response operator can utilize that contextual information to ask the most pertinent questions to dispatch a corresponding emergency service. Therefore, the automated machine language translation and human call taker service may be more difficult to implement than the automated machine language translation service, but may provide a more accurate translation. As a result, the automated machine language translation and human call taker service may also be more expensive than the automated machine language translation service. If an LEP is in an emergency situation where contextual accuracy is important, the automated machine language translation and human call taker service may be a more optimal solution than the automated machine language translation service.

As another example of the automated machine language translation and human call taker service, a human call taker may receive a custom request for a translation, e.g., a written translation of text from a first language into a second language. The custom request may be for text that is directed toward a field with particular terminology. Therefore, a human call taker may provide a consultation and a custom quote for the translation. For example, the human call taker may determine that certain portions of the text can be translated by a machine language translator whereas the remainder of the text should be translated by a human language translator.

Further, at a point 106, the spectrum 100 includes an over the phone human language interpretation service. The over the phone human language interpretation service allows a user to be connected with a human language interpreter through a telephone communication. The human language interpretation service can select a human language interpreter that is familiar with the particular terminology of a contextual environment of the speaker requesting language interpretation. For example, a speaker that is in need of language interpretation in a medical environment can request a human language interpreter that is familiar with medical terminology in the languages of both speakers. Further, a human language interpreter can typically perform language interpretation at the colloquial speed of the speakers, which may not occur with machine language interpreter services. As a result, the over the phone human language interpretation service can provide more accuracy than the machine language interpreter services. As scheduling human language interpreters/translators is typically more resource intensive than requesting an automated machine language interpretation/translation service, the over the phone human language interpretation service may be more difficult to implement than the language interpretation/translation services that rely partially or entirely on the use of machine language translators/interpreters. Further, the costs of utilizing human language interpreters/translators are typically more expensive than utilizing machine language interpreters/translators.

In addition, at a point 108, the spectrum 100 includes a video conferencing human language interpretation service. The video conferencing human language interpretation service allows a speaker to visually and/or audibly communicate with the human language interpreter/translator rather than just audibly as provided by the over the phone human language interpretation service. For example, a user in a medical context may be in need of a language interpretation that includes visual expressions to assist the user with performing a medical procedure. For instance, a medical professional that speaks English may be attending to a patient that speaks Spanish. A display screen may be situated in proximity to the medical professional and the patient so that the medical professional, patient, and language interpreter can observe physical expressions to help with communication. Alternatively, the speakers may be in different locations and may each utilize a computing device to communicate with the language interpreter at another computing device. Implementation and costs for the video conference human language interpretation service may be greater than that of the automated machine language interpretation/translation services as utilization of a human language interpreter is typically more expensive than a machine language interpreter.

At a point 110, the spectrum 100 includes a scheduling service for in person language interpretation. A user may prefer to have a language interpreter present in person for a language interpretation. Such a language interpretation provides the most accuracy as a language interpreter can observe the context of the language interpretation and utilize such information to provide an accurate language interpretation. Implementation and costs for the scheduling service for in person language interpretation may be greater than that of the other services provided by the spectrum 100.

The spectrum 100 provides only an example of a particular set of language interpretation/translation services. A variety of other language interpretation/translation services may alternatively be utilized.

Figure 2:
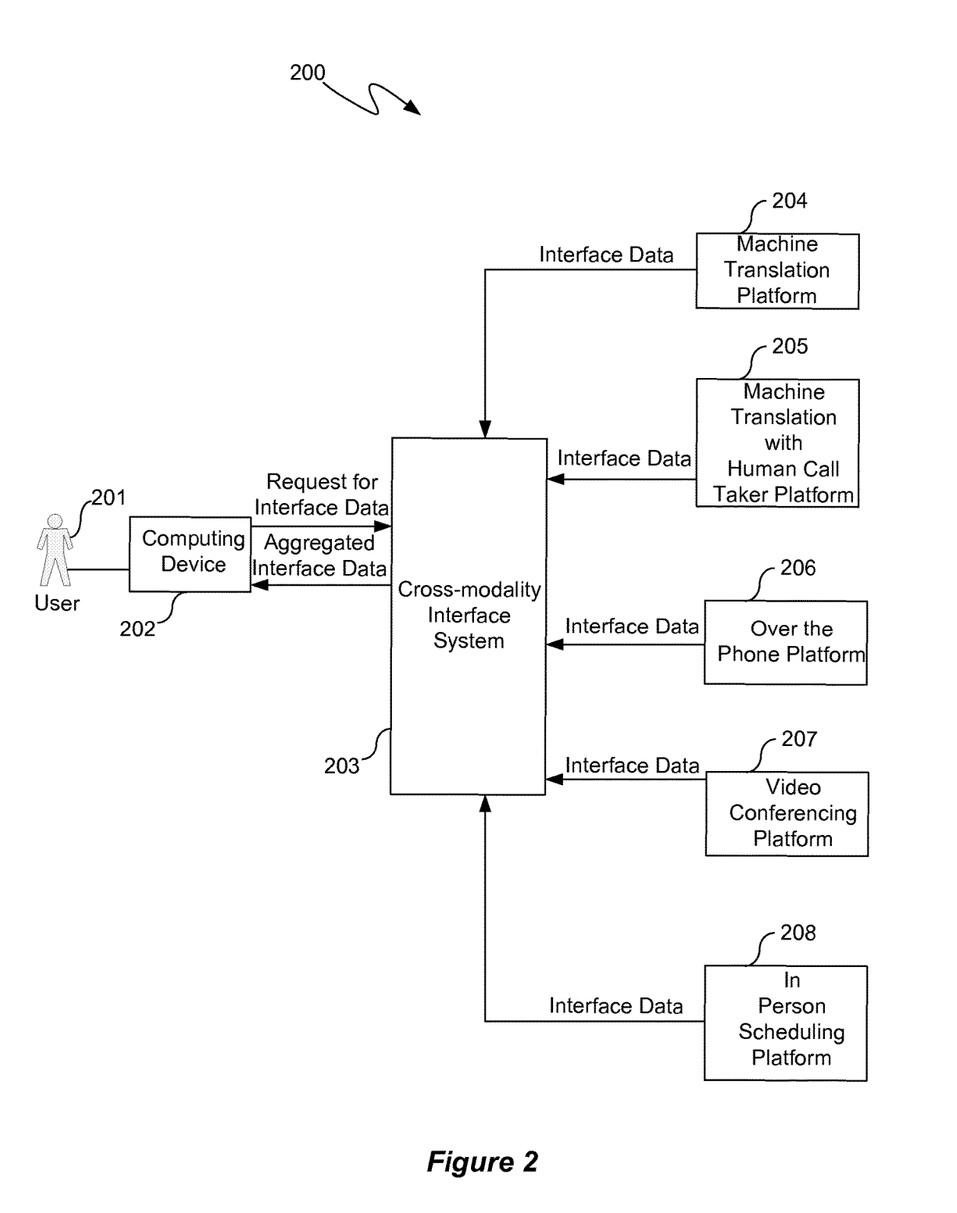
FIG. 2 illustrates a computerized interface configuration.

FIG. 2 illustrates a computerized interface configuration 200. The computerized interface configuration 200 provides a user 201 with a computerized interface to computerized implementations of the various language interpretation/translation services of the spectrum 100 illustrated in FIG. 1.

The computerized interface configuration 200 has a computing device 202 through which the user 201 communicates with a cross-modality interface system 203. The cross-modality interface system 203 provides interface data from a variety of different platforms 204, 205, 206, 207, and 208 to the computing device 202. Each platform corresponds to a different modality, i.e., a different mode of providing language interpretation/translation. For example, the machine translation platform 204 corresponds to an implementation of the automated machine language translation service at point 102 of the spectrum 100 illustrated in FIG. 1. Further, the machine translation with human call taker platform 205 corresponds to an implementation of the automated machine language translation and human call taker service at point 104 of the spectrum 100 illustrated in FIG. 1. In addition, the over the phone platform 206 corresponds to an implementation of the over the phone human language interpretation service illustrated at point 106 of the spectrum 100 illustrated in FIG. 1. The video conferencing platform 207 corresponds to an implementation of the video conferencing human language interpretation service at point 108 of the spectrum 100 illustrated in FIG. 1. Further, the in person scheduling platform 208 corresponds to an implementation of the scheduling service for in person language interpretation at point 110 of the spectrum 100 illustrated in FIG. 1.

The user 201 can receive a computerized interface at the computing device 202, e.g., a tablet device, smartphone, smartwatch, laptop computer, personal computer ("PC"), etc. For example, the user 201 can download an application from the cross-modality interface system 203 that displays the computerized interface and corresponding interface data. The computing device 202 may request interface data from the cross-modality interface system 203. The interface data may include proximity, interpreter/translator availability, cost, etc. The cross-modality interface system 203 receives and aggregates the interface data from each of the different platforms 204, 205, 206, 207, and 208. The cross-modality interface system then sends the aggregated interface data to the computing device 202.

In one embodiment, the cross-modality interface system 203 aggregates the interface data in real-time or near real-time. The cross-modality interface system 203 then sends the aggregated interface data to the computing device 202 in real-time or near real-time. The user 201 may then obtain accurate data for the different language interpretation/translation services provided by the platforms 204, 205, 206, 207, and 208 that helps the user 201 select an optimal language interpretation/translation platform that matches the current requirements of the user.

For example, a current priority for a business user may be an accurate language interpretation. Although the user 201 may prefer an in person language interpretation service, the user 201 may determine from the aggregated interface data that the nearest human language interpreter would not be available when needed by the user 201. The user 201 may then determine from the aggregated interface data that a human language interpreter can be available via the video conferencing platform 207 when needed by the user 201. As a result, the user 201 is able to obtain a high quality human language interpretation when needed.

In contrast, previous configurations often led to a user guessing as to which language interpretation/translation service may or may not be optimal for a certain context. For example, such a user may have waited for in person language interpretation to become available and not obtained language interpretation/translation when needed. The multi-channel cross-modality system provides a user with real-time or near real-time data that may be utilized by the user in conjunction with dynamically changing priorities of the user and environmental fluctuations, e.g., proximity, waiting time, price, etc., so that the user may select an optimal language interpretation/translation service.

Therefore, the computerized interface configuration 200 allows the user 201 to select an optimal language interpretation/translation service according to a real-time or near-real time set of criteria for the user. The cross-modality interface system 203 improves the functioning of a computer by allowing the computing device 202 to display real-time or near real-time interface data to the user 201 so that a language interpretation/translation service may be optimally selected.

The cross-modality interface system 203 may be operated via multiple channels. Examples of the channels include, but are not limited to, SMS/text, voice, video, video conferencing, web real-time communication ("WebRTC"), automated avatar, live holographic presence, and/or any other current or subsequent mode of communication that may be used to provide communication for language interpretation/translation services. Such channels may be provided via various forms of infrastructure, including but not limited to, Public Switched Telephone Network ("PSTN"), cellular towers, web applications, native mobile device applications, native tablet device applications, and/or any other current or subsequent infrastructure for channel implementation. Therefore, any of the platforms 204, 205, 206, 207, and 208 may implemented according to one or more channels.

Figure 3:
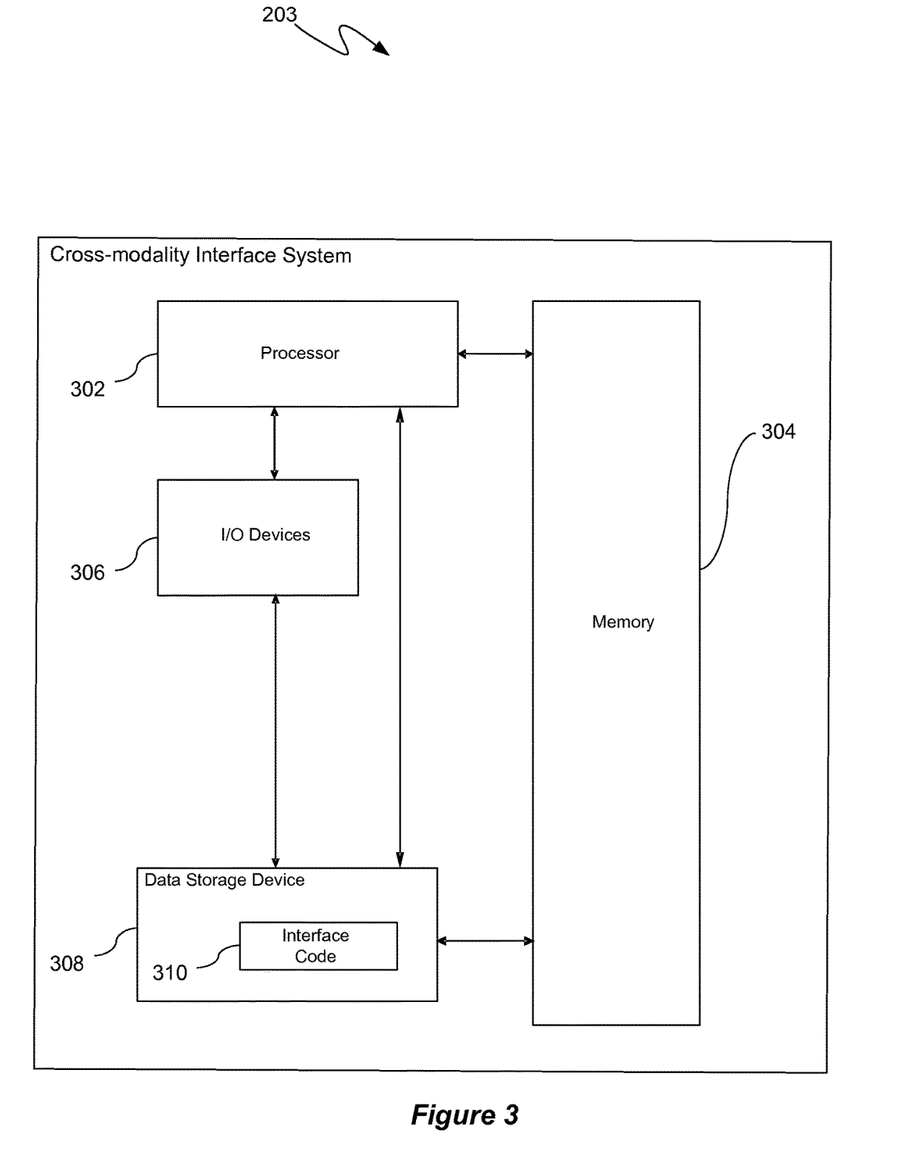
FIG. 3 illustrates the internal components of the cross-modality interface system illustrated in FIG. 2.

FIG. 3 illustrates the internal components of the cross-modality interface system 203 illustrated in FIG. 2. In one embodiment, the cross-modality interface system 203 is implemented utilizing a general purpose computer or any other hardware equivalents. Thus, the cross-modality interface system 203 comprises a processor 302, a memory 304, e.g., random access memory ("RAM") and/or read only memory (ROM), various input/output devices 306, e.g., a receiver, a transmitter, a user input device, a speaker, an image capture device, an audio capture device, etc., a data storage device 308, and interface code 310 stored on the data storage device 308.

The interface code 310 may be represented by one or more software applications or a combination of software and hardware, e.g., using application specific integrated circuits ("ASIC"), where the software is loaded from a storage device such as a magnetic or optical drive, diskette, or non-volatile memory and operated by the processor 302 in the memory 304 of the computer. As such, the interface code 310 and associated data structures may be stored on a computer readable medium such as a computer readable storage device, e.g., RAM memory, magnetic or optical drive or diskette, etc. The cross-modality interface system 203 may be utilized for a hardware implementation of any of the configurations provided herein.

Figure 4A:
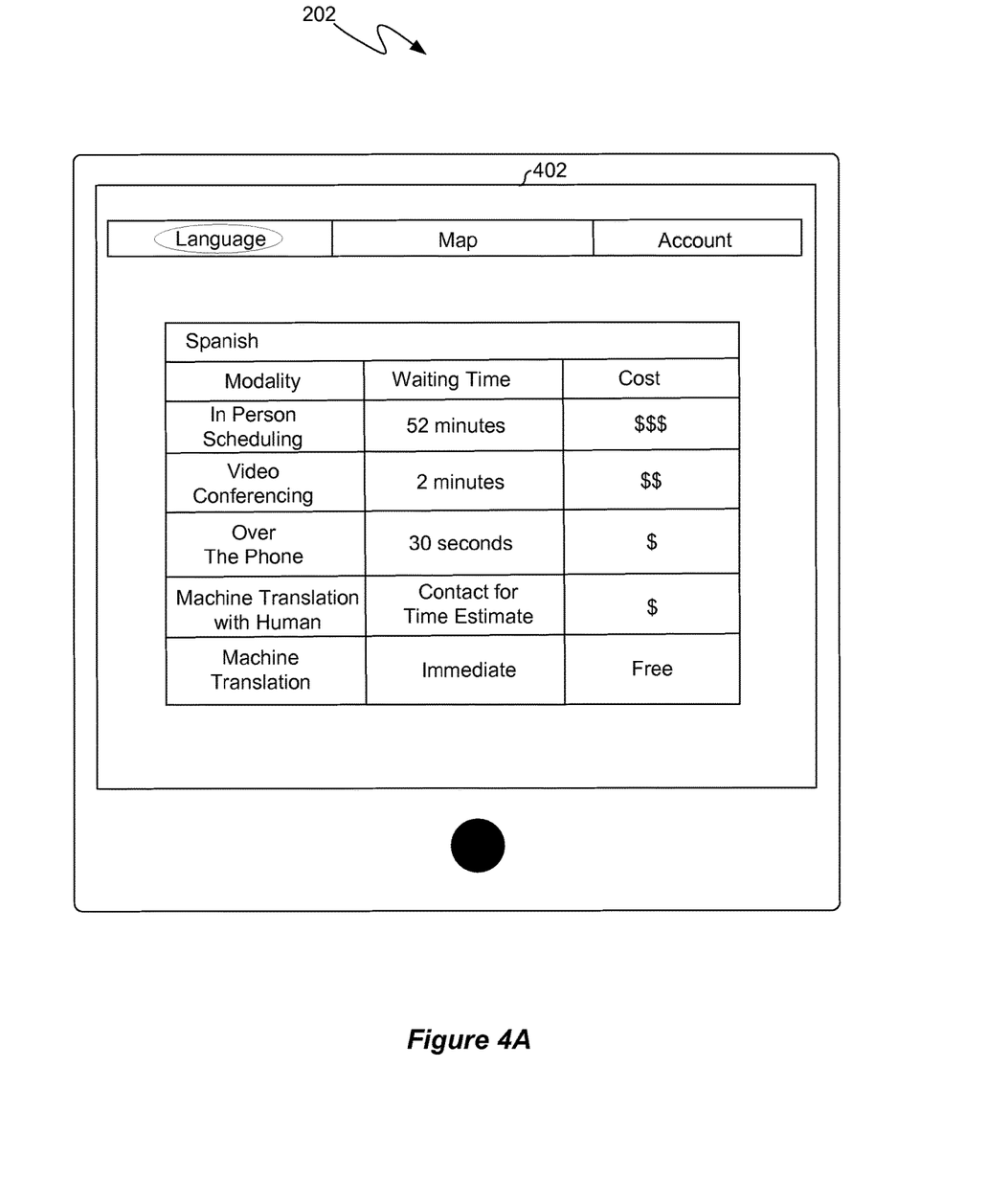
FIG. 4A illustrates the computerized interface for which different modalities of language interpretation/translation services are displayed based upon the aggregated interface data received by the computing device from the cross-modality interface system illustrated in FIG. 2.
Figure 4B:
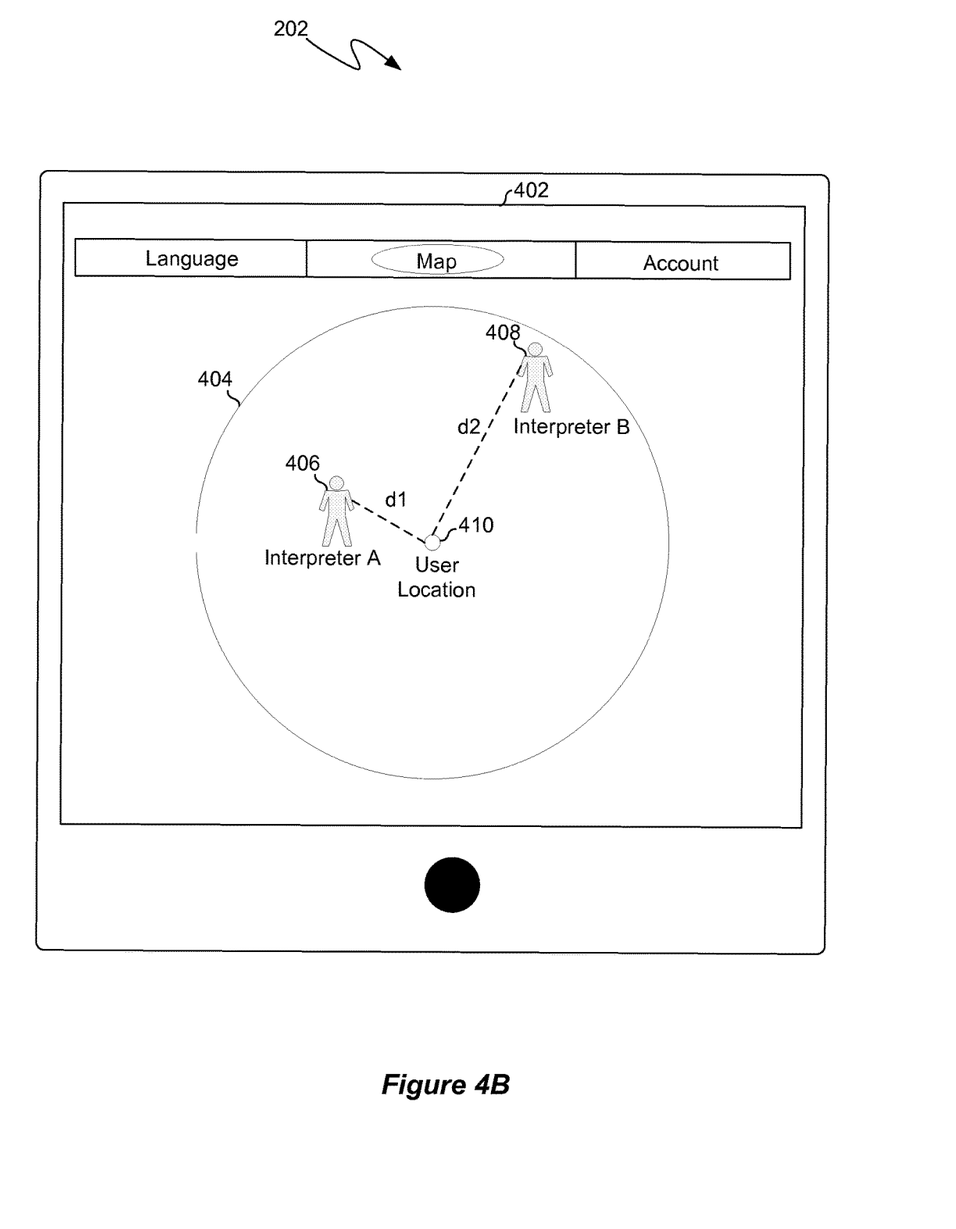
FIG. 4B illustrates the computerized interface illustrated in FIG. 4A displaying a map.
Figure 4C:
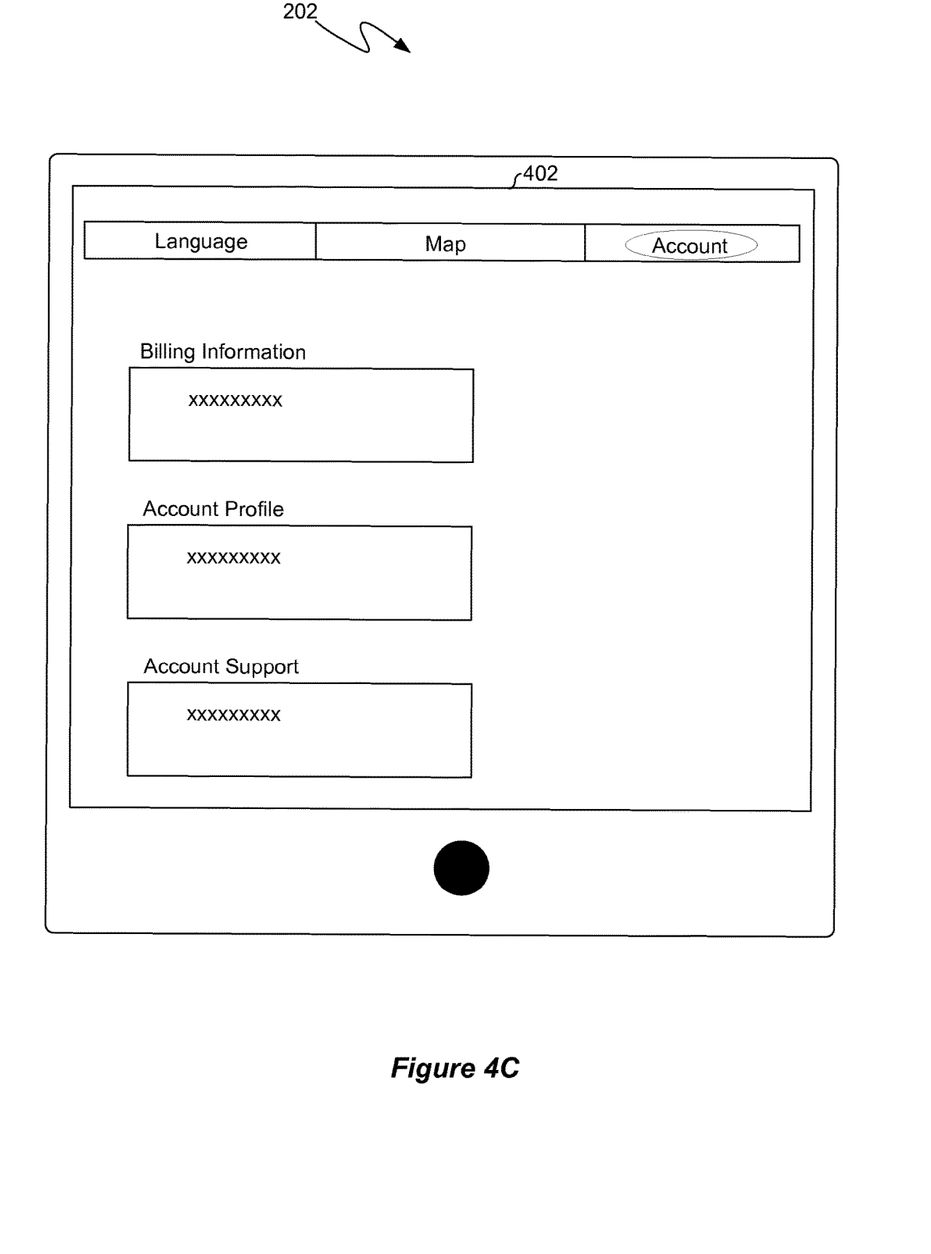
FIG. 4C illustrates an example display of the computerized interface having various account data.

FIGS. 4A-4C illustrate examples of a computerized interface 402 displayed by the computing device 202 illustrated in FIG. 2. FIG. 4A illustrates the computerized interface 402 for which different modalities of language interpretation/translation services are displayed based upon the aggregated interface data received by the computing device 202 from the cross-modality interface system 203 illustrated in FIG. 2.

As an example, a language tab has been selected. For instance, the user 201 may have selected Spanish as a language for which the user wants to obtain real-time or near real-time aggregated interface data. Various modalities for language interpretation/translation are illustrated. For example, modalities such as in person scheduling provided by the in person scheduling platform 208, video conferencing provided by the video conferencing platform 207, over the phone human language interpretation/translation provided by the over the phone platform 206, machine translation with human assistance provided by the machine translation platform 205, and machine translation without human assistance provided by the machine translation platform 204 as illustrated in FIG. 2 may be selected by the user 201 that views the computerized interface 402 on the computing device 202.

Various other data such as waiting time and cost corresponding to each of the modalities may be received in real time or near real time. As a result, the user 201 can view real time or near real time information that helps the user 201 determine an optimal language interpretation/translation solution based upon a set of criteria. For example, the user defined criteria may be determined by the user 201 based upon certain priorities. For instance, the user 201 may want an in person language interpretation session, but may not be able to wait fifty two minutes for a language interpreter to be available. The user 201 may then weigh such priorities and determine that the video conferencing service is the optimal language interpretation/translation solution for the user 201 for a current user defined set of criteria since the video conferencing service provides a human language interpreter, but with only a two minute wait time.

Alternatively, the computing device 202 or the cross-modality interface system 203 may be utilized to automatically select or generate a recommendation for the user 201 of an optimal language interpretation/translation solution. For example, the computing device 202 or the cross-modality interface system 203 may receive one or more inputs from the user 201 indicating the user defined criteria. The computing device 202 or the cross-modality interface system 203 may then perform a weighting of the different language interpretation/translation solutions based upon the user defined criteria, e.g., type of solution, waiting time, cost, etc. The computing device 202 or the cross-modality interface system 203 may then select or recommend the language interpretation/translation solution based upon the highest weighting as the optimal language interpretation/translation solution.

Other types of criteria such as proximity may also be utilized. FIG. 4B illustrates the computerized interface 402 illustrated in FIG. 4A displaying a map 404. The map 404 illustrates a user location 410, e.g., determined via GPS coordinates of the computing device 202 of the user 201. Further, the map illustrates the locations of various language interpreters 406 and 408, e.g., via GPS coordinates of computing devices utilized by the language interpreters 406 and 408, in addition to the corresponding distances of the user 201 to each of the language interpreters 406 and 408. Therefore, the user 201, the computing device 202, or the cross-modality interface system 203 may utilize the various proximities as a factor for determining whether or not an in person language interpretation session is an optimal language interpretation/translation service for the user 201.

FIG. 4C illustrates an example display of the computerized interface 402 having various account data. For example, the computerized interface 402 can display billing information, account profile information, and account support information. Various other data associated with an account of the user 201 can be provided to facilitate payment for the language interpretation/translation service that is selected.

In one embodiment, the user 201 registers with the cross-modality interface system 203 prior to being able to access the computerized interface 402. For example, the user 201 may electronically input some information to register an account for utilization of the cross-modality interface system 203.

In another embodiment, the user 201 is able to preview the computerized interface 402 without registration. Further, the user 201 may be able to utilize certain language interpretation/translation services without registration. For example, the user 201 may be able to utilize the machine translation platform 204 illustrated in FIG. 2 for free without registration, but would then have to register to utilize the language interpretation/translation services having a cost.

Figure 5:
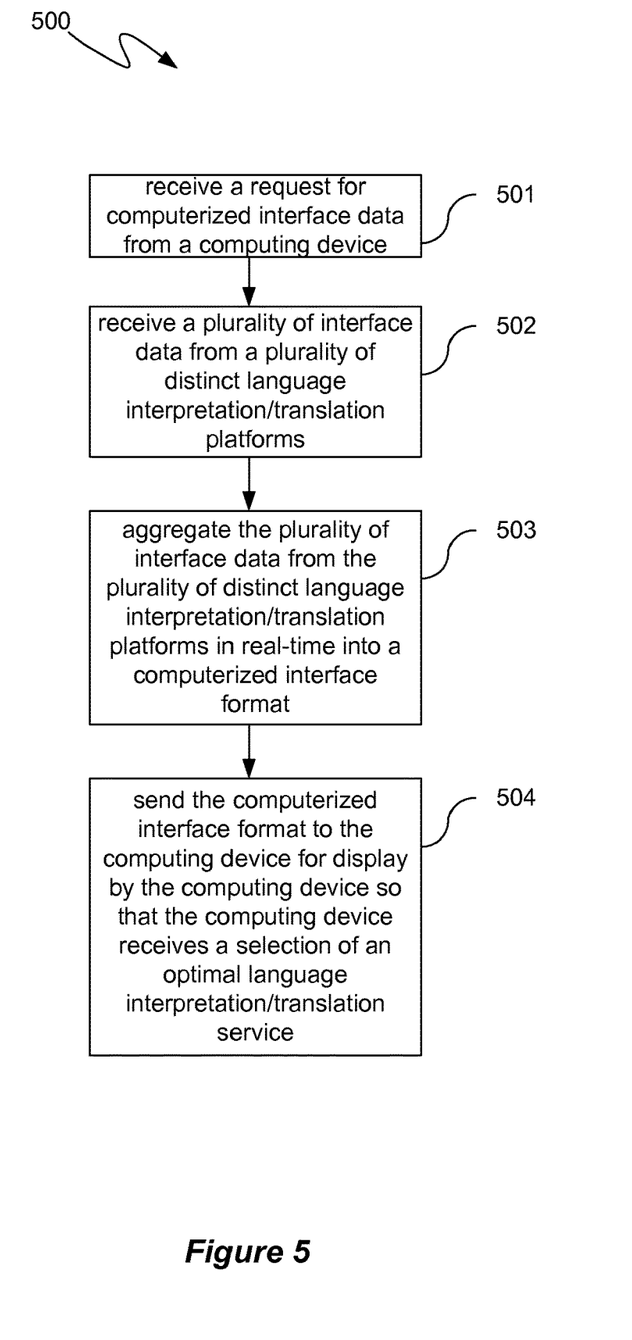
FIG. 5 illustrates a process that may be utilized to provide a computerized interface from data received from the cross-modality system illustrated in FIG. 2.

FIG. 5 illustrates a process 500 that may be utilized to provide a computerized interface from data received from the cross-modality system 203 illustrated in FIG. 2. At a process block 501, the process 500 receives a request for computerized interface data from a computing device. Further, at a process block 502, the process receives a plurality of interface data from a plurality of distinct language interpretation/translation platforms. Each of the plurality of distinct language interpretation/translation platforms provides a language/interpretation service according to a distinct modality. In addition, at a process block 503, the process 500 aggregates the plurality of interface data from the plurality of distinct language interpretation/translation platforms in real-time into a computerized interface format. At a process block 504, the process 500 also sends the computerized interface format to the computing device for display by the computing device so that the computing device receives a selection of an optimal language interpretation/translation service.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium such as a computer readable storage device. The instructions may also be created using source code or any other known computer-aided design tool. A computer readable medium may be any medium capable of storing those instructions and include a CD-ROM, DVD, magnetic or other optical disc, tape, silicon memory, e.g., removable, non-removable, volatile or non-volatile, etc.

A computer is herein intended to include any device that has a general, multi-purpose or single purpose processor as described above. For example, a computer may be a PC, laptop computer, set top box, cell phone, smartphone, tablet device, portable media player, video player, etc.

It is understood that the computer program products, apparatuses, systems, and processes described herein may also be applied in other types of apparatuses, systems, and processes. Those skilled in the art will appreciate that the various adaptations and modifications of the embodiments of the compute program products, apparatuses, systems, and processes described herein may be configured without departing from the scope and spirit of the present computer program products, apparatuses, systems, and processes. Therefore, it is to be understood that, within the scope of the appended claims, the present computer program products, apparatuses, systems, and processes may be practiced other than as specifically described herein.

I claim:

1. A computer implemented language interpretation/translation platform comprising:

a receiver that receives, via a network, a request for a computerized user interface from a computing device based upon a user input at the computing device, the receiving further receiving, via the network, a plurality of interface data from a plurality of distinct language interpretation/translation platforms, each of the plurality of distinct language interpretation/translation platforms providing a language interpretation/translation service according to a distinct modality from each other such that each distinct modality is based on a distinct channel for a distinct form of delivery of the language interpretation/translation service by a human language interpreter/translator;

a processor that automatically generates the computerized user interface in real-time, as measured from a time that the request was received to a subsequent time without a perceivable time delay, the computerized user interface comprising a menu having a plurality of modality indicia, each of the plurality of modality indicia corresponding to one of a plurality of applications that is associated with one of the plurality of distinct language interpretation/translation platforms, the computerized user interface further comprising a plurality of delivery wait time indicia corresponding to a wait time for the delivery of the language interpretation/translation service via each of the plurality of applications; and a transmitter that sends, via the network, the computerized user interface to the computing device so that the computing device displays the menu and activates one of the plurality of applications upon receiving a user input for one of the plurality of modality indicia in the menu corresponding to said one of the plurality of applications, wherein the activation of the one of the plurality of applications delivers the corresponding language interpretation/translation service to the computing device.

2. The computer implemented language interpretation/translation platform of claim 1, wherein the plurality of applications comprises a video conferencing application that delivers the corresponding language interpretation/translation service via a video conferencing platform that provides human language interpretation and an audio-based application that delivers the corresponding language interpretation/translation service via a telephone platform.

3. The computer implemented language interpretation/translation platform of claim 1, wherein the computerized user interface displays an update in real time to the waiting time for access to each of the plurality of distinct language interpretation/translation platforms.

4. The computer implemented language interpretation/translation platform of claim 1, wherein the computerized user interface displays in real time a cost for access to each of the plurality of distinct language interpretation/translation platforms.

5. The computer implemented language interpretation/translation platform of claim 4, wherein the computerized user interface displays an update in real time to the cost for access to each of the plurality of distinct language interpretation/translation platforms.

6. The computer implemented language interpretation/translation platform of claim 1, wherein the computerized user interface further displays in real time a map and a proximity of a user associated with the computing device to one or more human language interpreters that are available for an in person language interpretation session.

7. The computer implemented language interpretation/translation platform of claim 1, wherein the processor further generates the computerized user interface by weighting the plurality of modality indicia according to one or more real time criteria of a user associated with the computing device.

8. The computer implemented language interpretation/translation platform of claim 7, wherein the one or more real time criteria comprises the wait time and a cost for the delivery of the corresponding language interpretation/translation service.

9. The computer implemented language interpretation/translation platform of claim 1, wherein the processor generates a recommendation for an optimal language interpretation/translation service for the user associated with the computing device.

10. The computer implemented language interpretation/translation platform of claim 9, wherein the processor further generates the computerized user interface to display the recommendation.

11. A computer program product comprising a non-transitory computer readable medium having a computer readable program stored thereon, wherein the computer readable program when executed on a computer causes the computer to:

receive a request for a computerized user interface from a computing device via a network based upon a user input at the computing device;

receive a plurality of interface data from a plurality of distinct language interpretation/translation platforms via the network, each of the plurality of distinct language interpretation/translation platforms providing a language interpretation/translation service according to a distinct modality from each other such that each distinct modality is based on a distinct channel for a distinct form of delivery of the language interpretation/translation service by a human language interpreter/translator;

automatically generate the computerized user interface in real-time, as measured from a time that the request was received to a subsequent time without a perceivable time delay, into a computerized interface format, the computerized user interface comprising a menu having a plurality of modality indicia, each of the plurality of modality indicia corresponding to one of a plurality of applications that is associated with one of the plurality of distinct language interpretation/translation platforms, the computerized user interface further comprising a plurality of delivery wait time indicia corresponding to a wait time for the delivery of the language interpretation/translation service via each of the plurality of applications; and send the computerized user interface to the computing device, via the network, so that the computing device so that the computing device displays the menu and activates one of the plurality of applications upon receiving a user input for one of the plurality of modality indicia corresponding to said one of the plurality of applications, wherein the activation of the one of the plurality of applications delivers the corresponding language interpretation/translation service to the computing device.

12. The computer program product of claim 11, wherein the plurality of applications comprises a video conferencing application that delivers the corresponding language interpretation/translation service via a video conferencing platform that provides human language interpretation and an audio-based application that delivers the corresponding language interpretation/translation service via a telephone platform.

13. The computer program product of claim 11, wherein the computerized user interface displays an update in real time to the waiting time for access to each of the plurality of distinct language interpretation/translation platforms.

14. The computer program product of claim 11, wherein the computerized user interface displays in real time a cost for access to each of the plurality of distinct language interpretation/translation platforms.

15. The computer program product of claim 14, wherein the computerized user interface displays an update in real time to the cost for access to each of the plurality of distinct language interpretation/translation platforms.

* * * * *